G. H. FISHER & P. J. O'NEIL.
APPARATUS FOR MAKING ARTIFICIAL ICE.
APPLICATION FILED FEB. 6, 1911.
1,020,195.
Patented Mar. 12, 1912.
2 SHEETS—SHEET 2.
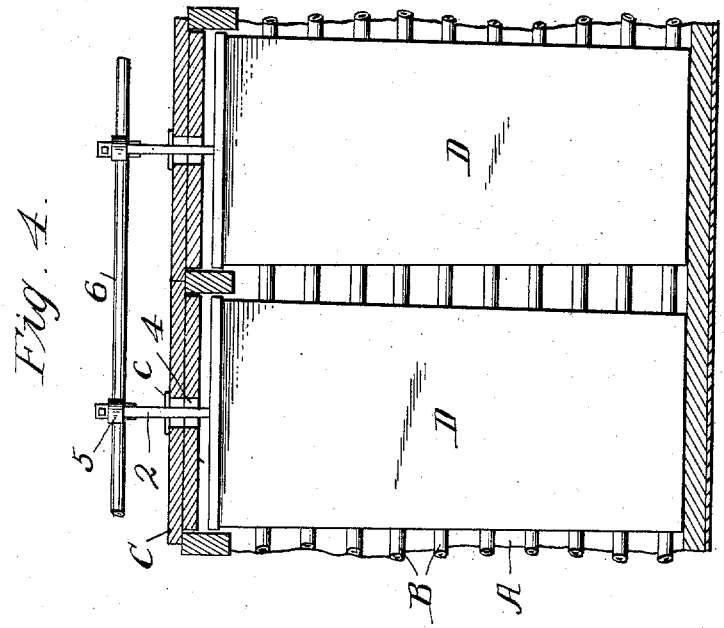
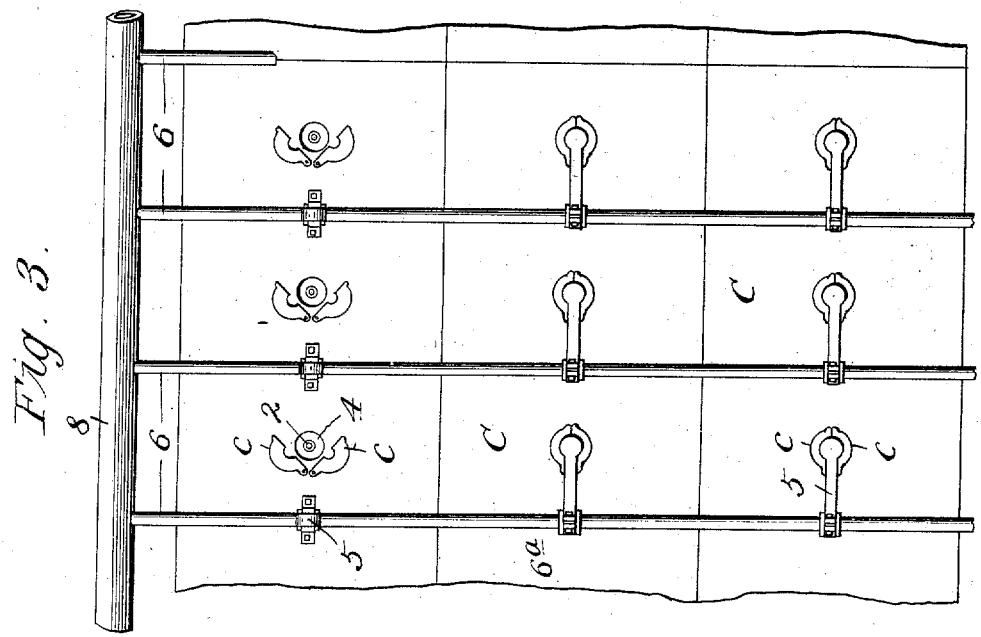
Witnesses:
E. C. Lillian,
J. C. Craven
Inventors:
G. H. Fisher,
and P. J. O'Neil,
By F. G. Fischer, atty.

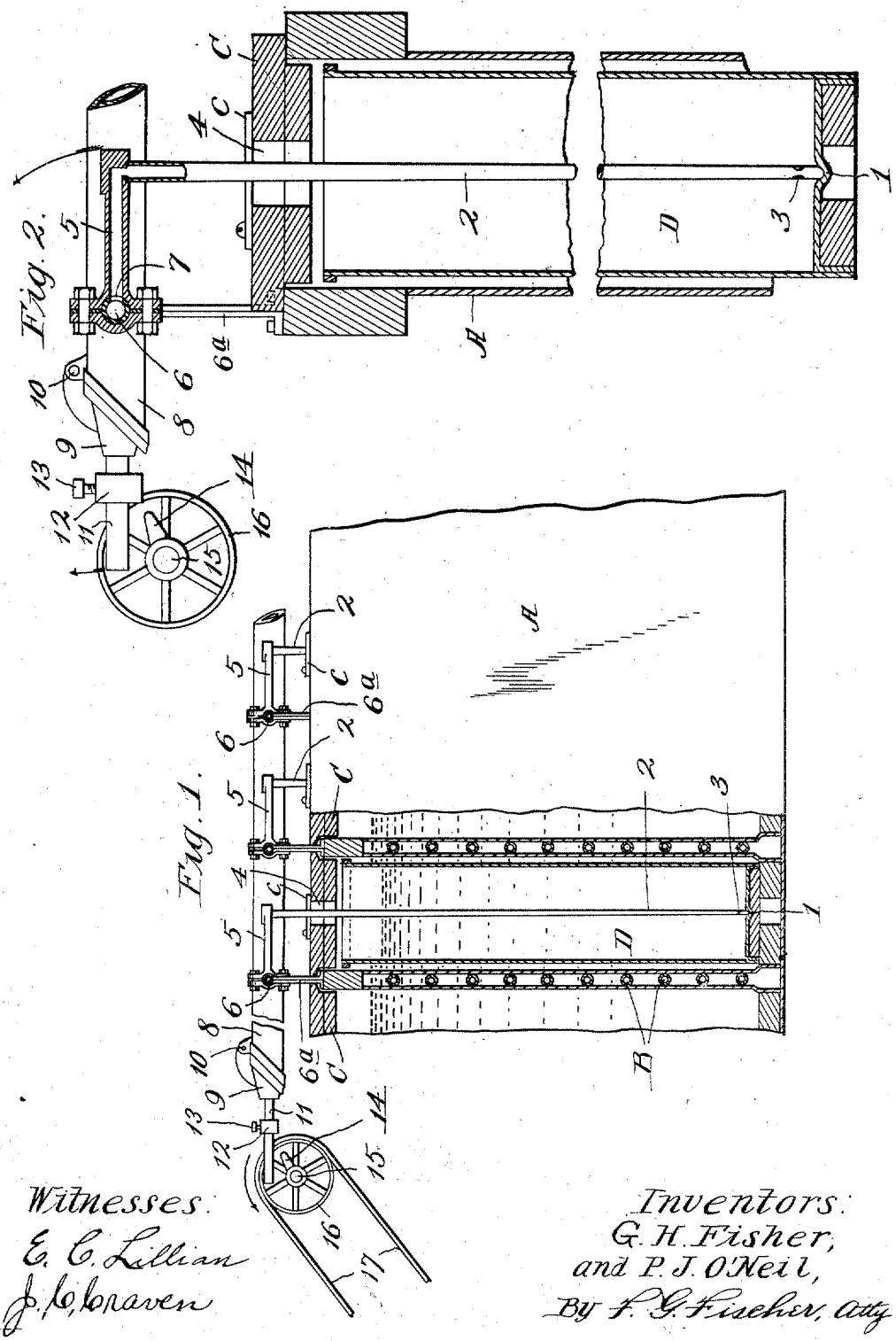

UNITED STATES PATENT OFFICE.

GEORGE H. FISHER, AND PHILIP J. O'NEIL, OF LEAVENWORTH, KANSAS.

APPARATUS FOR MAKING ARTIFICIAL ICE.

1,020,195.  Specification of Letters Patent.  Patented Mar. 12, 1912.

Application filed February 6, 1911. Serial No. 606,960.

*To all whom it may concern:*

Be it known that we, GEORGE H. FISHER and PHILIP J. O'NEIL, citizens of the United States, residing at Leavenworth, in the county of Leavenworth and State of Kansas, have invented certain new and useful Improvements in Apparatus for Making Artificial Ice, of which the following is a specification.

Our invention relates to the manufacture of artificial ice from raw water, *i. e.* water which has not been distilled, and our objects are to provide an improved apparatus whereby the raw water may be frozen under such conditions as will result in the formation of crystal ice, free from impurities.

Many persons skilled in the art of the manufacture of artificial ice, are aware that if a body of raw water be congealed while in a state of perfect rest, the ice thus produced will have a cloudy, nontransparent, and impure appearance, that reduces its market value, although the ice may be chemically as pure, or purer, than the water from which it was manufactured.

Our invention has for one of its objects, the elimination from the ice of the objectionable features above enumerated.

By personally conducted experiments we have discovered that the foregoing object can be economically and successfully attained by agitating through means of water-jets, the raw water during the freezing process, and our invention relates more particularly to the agitation and circulation by water-jets of the raw water to be congealed, and the manner in which said water-jets are produced, applied, and governed.

The simplicity, construction, and operation of our invention is such that it can be readily applied to ice making plants now installed on the distilled water principle, without discarding any part of said plants, it being only necessary to discontinue the use of the distilling apparatus when making ice from raw water. No special refrigerant, or special size or design of congealing-cans, brine-tanks, hoists or appliances other than those now in general use will be required in the application of our invention to existing distilled water ice-plants. Therefore, any established distilled water ice-plant, may be equipped with our invention, so that ice may be produced either from raw water or distilled water, as desired.

Referring to the accompanying drawings which show the preferred form of apparatus for carrying out our invention: Figure 1 is a side elevation partly in section, of an ordinary brine-tank, provided with our improvements. Fig. 2 is an enlarged view of the same. Fig. 3 is a broken plan view of the brine-tank, provided with our improvements. Fig. 4 is a section on line IV—IV of Fig. 3.

A, designates a brine-tank of ordinary or preferred construction, for the purpose of making artificial ice according to the can or block system.

B, designates ammonia-coils submerged in the brine-tank A, which latter is provided with a series of covers C, to normally cover the openings through which the congealing-cans D are inserted and removed from tank A. Congealing-cans D are of the customary construction except that each has a central depression 1, in its bottom portion to center a downwardly tapering jet-tube 2, having ports 3, at its lower end. Jet-tubes 2, extend upward through the congealing-cans D and through central openings 4 in covers C, and their upper open terminals communicate each with a hollow coupling 5. Covers C are provided with pivotally-mounted lids *c*, adapted to embrace tubes 2 and close the openings 4. Couplings 5 are swiveled in series upon a plurality of branch-pipes 6, having ports 7, which communicate with said couplings when the same occupy their normal or horizontal positions, as shown in Figs. 1 and 2. Branch-pipes 6, are supported by a plurality of stands 6*. Branch-pipes 6 communicate with a header 8 containing fluid (preferably compressed air) under pressure. One end of header 8 communicates, preferably, with an air-compressor, and its opposite end is provided with a relief-valve 9, operably secured thereto by a hinge 10. Valve 9 is provided at its free end with a stem 11, having a counterweight 12, adjustably-mounted thereon to assist in closing the valve after the same has been opened. A set-screw 13, is provided to lock the counterweight 12 at any of its adjusted positions upon stem 11.

14 designates a cam adapted to impinge against stem 11, and thus open valve 9. Cam 14 is fixed to a shaft 15, provided with a pulley 16, driven by a belt 17, leading from any suitable motor.

In practice the congealing-cans are lowered into the brine-tank A and filled to the proper level with raw water. Covers C are placed in position and the jet-tubes 2 are passed through openings 4 until their lower terminals rest in depressions 1. Openings 4 are then closed by lids c, and couplings 5 are lowered into engagement with the upper open ends of the jet-tubes. As the jet-tubes are inserted in the congealing cans D, the water will enter said jet-tubes through ports 3 to a level with the surrounding water in the cans. Then when the necessary maximum air-pressure is established in the header 8, branch pipes 6, couplings 5 and jet-tubes 2, a certain amount, say, nine-tenths, of the water in the jet-tubes will be forced back into the can. Pressure is then reduced to low or no pressure by cam 14 engaging stem 11, and opening valve 9 to permit the compressed air or a portion thereof in header 8 to exhaust therefrom. When the pressure is thus reduced the counteracting force of gravity will again force water into the interior of the jet-tubes through ports 3, to a level with the surrounding water in the congealing-cans D. Therefore, an alternating high and low, or no pressure, is obtained, which acts like a piston in alternately forcing water from the jet-tubes 2, and permitting it to reënter said tubes. This alternating in and out flow of water in the jet-tubes, agitates and circulates the surrounding water in the congealing-cans, promoting the escape of free gas, air-bubbles and other undesirable elements from the water during the process of freezing and resulting in the production of crystal ice. The jet-tubes 2, may be removed as soon as the process of freezing has proceeded far enough for the ice to contact with said tubes, and the resultant holes filled with water which is permitted to freeze, or said jet-tubes may be allowed to remain until the ice freezes solidly around the same and then be withdrawn after the ice-blocks have been removed from the congealing-cans, leaving holes through the centers of the ice-blocks, available for the introduction of a bar, or other tool to facilitate handling the ice-blocks. When the jet-tubes 2 and the congealing-can D, are to be removed, couplings 5 are swung upward to a vertical position, so that they will be out of the way, and also cut off the flow of fluid through ports 7.

Having thus described our invention what we claim, and desire to secure by Letters Patent is:

1. In combination with a congealing-can adapted to contain water, a tube removably arranged within said can and provided with ports so that the water can enter said tube to a level with the surrounding water in the can, a pipe having a port, a hollow coupling swiveled upon said pipe and adapted, when in operative position to communicate with the port therein and the upper open end of the tube, said coupling being further adapted, when swung to an inoperative position out of contact with the tube, to close the port in the pipe, and means for applying intermittent pressure through the pipe, the coupling, and the tube to the water in the latter to expel all, or a portion of said water into the can to agitate the water in the latter.

2. In combination with a plurality of congealing-cans adapted to contain water, tubes arranged within said cans and provided with ports so that the water can enter said tubes to a level with the surrounding water in the cans, a plurality of branch-pipes having ports therein, couplings connecting said branch-pipes and the upper open ends of the tubes, a header communicating with the branch-pipes, and means for intermittently opening said header.

3. In combination with a plurality of congealing-cans adapted to contain water, tubes arranged within said cans and provided with ports so that the water can enter said tubes to a level with the surrounding water in the cans, a plurality of branch-pipes having ports therein, couplings connecting said branch-pipes and the upper open ends of the tubes, a header communicating with the branch-pipes, and a valve communicating with said header.

4. In combination with a plurality of congealing-cans adapted to contain water, tubes arranged within said cans and provided with ports so that the water can enter said tubes to a level with the surrounding water in the cans, a plurality of branch-pipes having ports therein, couplings connecting said branch-pipes and the upper open ends of the tubes, a header communicating with the branch-pipes, a valve communicating with said header, and a cam to intermittently open said valve.

5. In combination with a brine-tank, and a cover therefor, having a central opening therethrough, a congealing-can adapted to contain water and be lowered into said brine-tank and having a central depression therein, a tube centered within said can by the depression therein, said tube being provided with ports so that the water can enter said tube to a level with the surrounding water in the can, pivotally-mounted lids on the cover to close the central opening therein and embrace the tube, and means for applying intermittent pressure to the water in the tube to expel all, or a portion thereof into the can to agitate the water in the same.

In testimony whereof we affix our signatures, in the presence of two witnesses.

GEORGE H. FISHER.
PHILIP J. O'NEIL.

Witnesses:
 A. P. DANIEL,
 R. R. HILL.